(12) United States Patent
Unrath

(10) Patent No.: US 6,193,830 B1
(45) Date of Patent: Feb. 27, 2001

(54) PLEATED FILTER INSERT AND METHOD OF MANUFACTURE

(75) Inventor: Dieter Unrath, Weinheim (DE)

(73) Assignee: Firma Carl Freudenberg, Weinheim (DE)

( * ) Notice: Subject to any disclaimer, the term of this patent is extended or adjusted under 35 U.S.C. 154(b) by 588 days.

(21) Appl. No.: 08/577,583

(22) Filed: Dec. 22, 1995

(30) Foreign Application Priority Data

Dec. 22, 1994 (DE) .................................................. 44 45 842

(51) Int. Cl.[7] ........................................................ B31F 1/20
(52) U.S. Cl. ............................ 156/226; 156/227; 156/210; 156/218; 156/73.1; 210/494.2; 210/494.3
(58) Field of Search .................................... 156/226, 227, 156/210, 218, 73.1; 210/494.2, 494.3

(56) References Cited

U.S. PATENT DOCUMENTS 2,663,660 * 12/1953 Layte ....................................... 154/81

* cited by examiner

Primary Examiner—Patrick Ryan
Assistant Examiner—M. Alexandra Elve
(74) Attorney, Agent, or Firm—Kenyon & Kenyon

(57) ABSTRACT

A method for manufacturing a filter insert, configured as a folding pack and made of thermoplastically bondable nonwoven material, such that a planar filter medium is first folded and then immobilized in a permanent form at a preset fold spacing by delivery of energy and subsequent cooling, such that after the process step of creating a defined fold spacing, the two outer edges of the folded pack are positively clamped into comb-like profiles, substantially corresponding to the fold geometry and dimensions of the folded pack and engaging in toothed fashion into the top and bottom of the folds, the spacing between which is chosen to be the same as or slightly less than the thickness of the nonwoven fiber fabric, wherein the folded filter material projects beyond the comb-like profiles at each outer edge a distance less than 1 times the fold spacing, wherein a sealing band, corresponding in width substantially to the height of the folds, is laid on the outer edges on the long sides, and in each case compressed by means of pressure elements acting laterally thereon and at the same time thermally bonded, with energy delivered via the pressure elements, to the outer edges of the filter material. The bond points are pressed together and immobilized until they cool. The profiles are then removed, and the folded pack is cut to length.

5 Claims, 3 Drawing Sheets

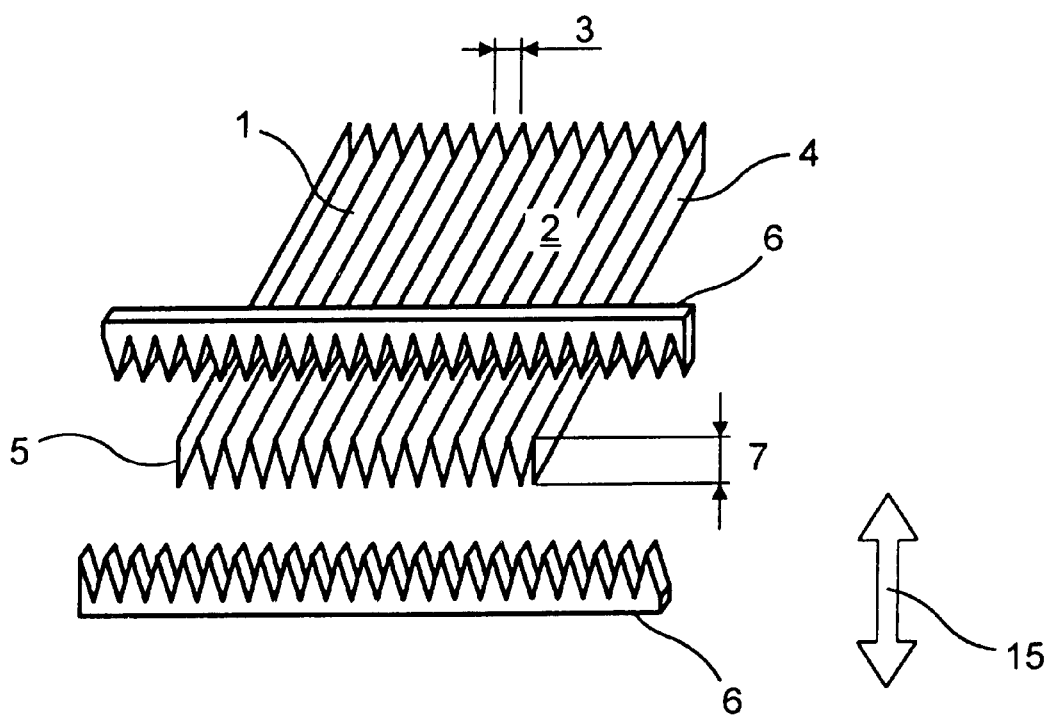
F I G. 2

PLEATED FILTER INSERT AND METHOD OF MANUFACTURE

BACKGROUND OF THE INVENTION

The invention relates to a filter insert, configured as a pleated pack and made of thermoplastically bondable nonwoven material, such as fiber material, and a method of its manufacture.

Such a filter pack and method are known from EP 0 438 639 B1, corresponding to U.S. Pat. No. 5,167,740, which is incorporated herein by reference.

In particular, the invention, like that disclosed in U.S. Pat. No. 5,167,740, relates to a filter insert comprising a planar filter medium folded and then set in its folded (pleated) form at a specific fold spacing.

In U.S. Pat. No. 5,167,740, after the process step of creating a defined fold spacing, the two outer edges of the filter insert are clamped into comb-like profiles, having profiles substantially corresponding to the fold pattern to engage in toothed fashion into the top and bottom of the folds. The spacing between the comb-like profiles is chosen to be the same as or slightly less than the thickness of the nonwoven material.

In U.S. Pat. No. 5,167,740, the filter material is allowed to project beyond the comb-like profiles, on each long side of the folded pack, a distance equal to 1.5 to 2.5 times the fold spacing. Subsequently, the resulting excess-length material is folded by means of a pressure element acting laterally thereon, until the excess-length material lies against the adjacent fold end so that the edges overlap. The overlap zone is simultaneously thermally bonded by means of energy delivered via the pressure element.

A filter insert produced in this manner possesses great inherent stability, so that an additional receiving frame can be omitted for installation in a filter housing. A further advantage of the filter insert manufactured with this known method is its good recycling capability, since the filter insert is made of only one material, namely the nonwoven material. The known filter insert is flexurally strong in three coordinate axes, the flexural strength resulting from bonding of the excess-length material of each fold to the adjacent folds. The consolidated side surfaces thus perform the function of a frame. Because of the large excess length, which equals 1.5 to 2.5 times the fold spacing, creasing and overlapping of all adjacent folds in one direction results in a closed side surface which imparts three-dimensional rigidity to the known filter.

SUMMARY OF THE INVENTION

It is an object of the invention to develop further a manufacturing method for a filter insert, configured as a folded pack, of the aforesaid type, in such a way that the filter insert is flexurally and torsionally movable and that the manufacturing method can be implemented easily with few operations.

In accordance with the present invention, during manufacture the folded filter material projects beyond the comb-like profiles at each outer edge a distance less than the distance of the fold spacing. A sealing band, having a width corresponding substantially to the height of the folds, is laid on the outer edges on the long sides. The sealing bands are then compressed by pressure elements acting laterally thereon and at the same time thermally bonded, with energy delivered via the pressure elements, to the outer edges of the filter material. The bond points so formed are pressed together and immobilized until they cool. The comb-like profiles are then removed, and the folded pack is cut to length.

In the context of this specification, and the claims hereto, the "fold spacing" is understood to be the distance between adjacent fold peaks. Preferably, during manufacture, the outer edges of the folded filter material project beyond the comb-like profiles at a distance of 0.1 to 0.5 times the fold spacing. At this length, folding the excess length does not result in the extent of overlap taught in the prior art U.S. Pat. No. 5,167,740. Accordingly, and advantageously, a filter insert manufactured in accordance with the invention is flexurally and torsionally movable in the lengthwise direction, transverse to the folds of the folded pack. This type of movability of the filter insert is advantageous especially when the latter is to be mounted in filter housings that enclose a rounded, domed, or internally contorted installation space.

The sealing bands are also preferably made of a nonwoven material. Thus, thermal bonding of the sealing bands to the filter material is facilitated. The pressure elements are heated to a temperature that is above the melting range of the bondable constituents of the sealing bands and/or the nonwoven material of the folded pack. In order to avoid impairing the sealing regions other than the points to be bonded, the pressure elements preferably consist of ultrasonic sonotrodes. Ultrasonic sonotrodes allow localized bonding of the sealing bands to the outer edges of the filter material. Thus, by means of the pressure elements, the sealing bands are sealed only at spots or lines, and adhesively joined to the outer edge of the filter material by the meltable constituents. Outside the regions in which the sealing bands are bonded, the sealing bands have a comparatively uncompressed structure, which facilitates sealing the periphery of the folded pack with respect to a filter housing.

The invention also relates to a filter insert in the form of a folded pack manufactured according to the method described above. The sealing bands consist of a nonwoven material and each has a height corresponding to the height of the folded pack. The sealing bands are preferably bonded to the outer edges of the folded pack. Each sealing band is preferably bonded by at least two straight-line bonding beads, running parallel to one another, preferably extending along each outer edge of the folded pack, and bounding at least one substantially uncompressed section of the sealing band. With an embodiment of this kind, it is advantageous that the sealing bands form, in the direction of the pressure differential and transverse to the direction of the bonding beads, a labyrinth seal with the adjacent housing, since only the uncompressed regions of the sealing bands contact the housing in the form of sealing lips.

BRIEF DESCRIPTION OF THE DRAWINGS

FIG. 2 shows a perspective, schematic depiction of the components of the filter insert, as well as the comb-like profiles used in the manufacturing process;

DETAILED DESCRIPTION OF THE DRAWINGS

Figure 1:
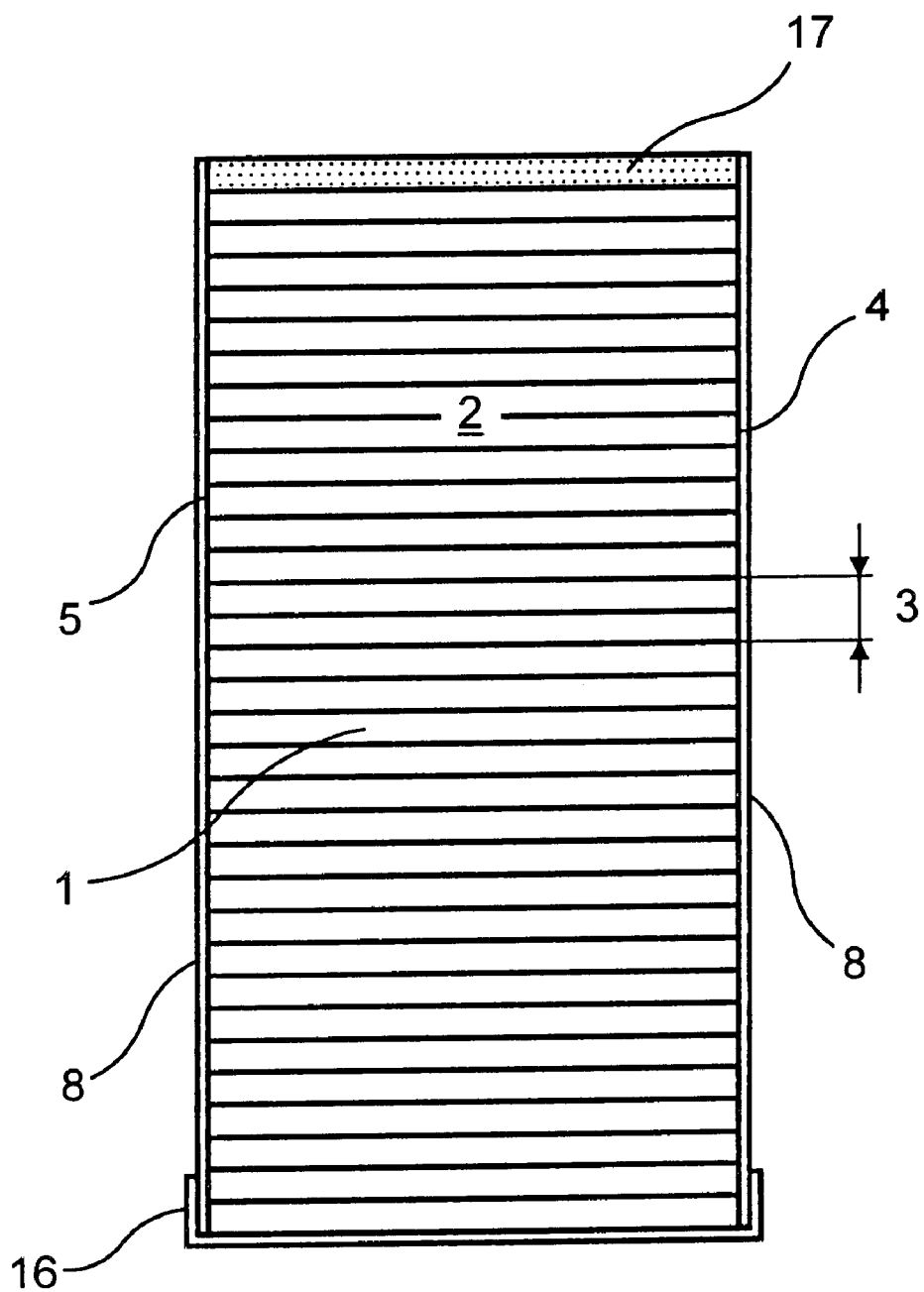
FIG. 1 shows a plan view of a filter insert manufactured in accordance with the invention.

FIG. 1 shows a plan view of a filter insert, configured as a folded (pleated) pack 1, made of thermoplastically bondable nonwoven material 2. Sealing bands 8 are arranged on respective outer edges 4, 5 of the folded pack 1. The nonwoven material 2 of the folded pack 1 must be capable of being bonded to the sealing bands 8. This allows joining the sealing bands 8 to the nonwoven material 2 without any additional medium, such as adhesive. In this exemplary embodiment, the sealing bands 8 are also made of a nonwoven material.

Figure 3:
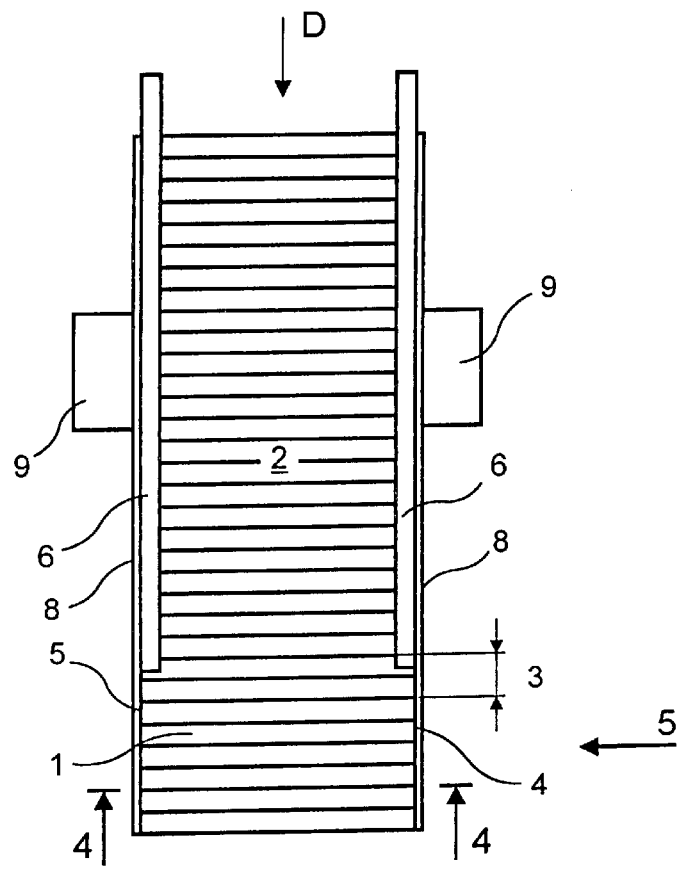
FIG. 3 shows a plan view of a filter insert according to FIG. 2, in which the sealing bands are joined by means of pressure elements to the nonwoven material of the folded pack.

The method of manufacturing the filter insert of FIG. 1 is shown schematically in FIGS. 2 and 3.

As shown in FIG. 2, to join the outer edge 5 of the folded pack 1 to a sealing band (not depicted here), the outer edge 5 is clamped between comb-like profiles 6. The profiles 6 have surfaces corresponding to the fold geometry and dimensions of the folded pack 1. The profiles 6 are moved in the direction of double arrow 15 in such a way that the folded pack 1 is retained between the profiles 6. In the illustrated embodiment, when the profiles 6 are moved inward toward each other, the outer edge 5 projects beyond the profiles 6 (on the side which is to face pressure element 9), as shown in FIG. 3 by a distance equal to 0.3 times the fold spacing 3, the fold spacing 3 being understood as the spacing between the adjacent fold peaks.

In FIG. 3, the movement direction of folded pack 1 during attachment of the sealing bands 8 is indicated as the direction "D". Pressure elements 9, configured as ultrasonic sonotrodes, are arranged on either side of the outer edges 4, 5, and bond the sealing bands 8 to the outer edges 4, 5. The sealing bands 8 are each compressed by the pressure elements 9, and are simultaneously thermally bonded by the pressure elements 9 to the filter material 2. As described below with reference to FIGS. 4 and 5, in the illustrated embodiment, the sealing bands 8 are each bonded by two straight line bonding beads 10, running parallel to each other. The compression of sealing bands 8 by the pressure elements 9 is maintained until the bonding beads 10 have cooled and the sealing bands 8 are fastened to outer edges 4, 5. Subsequent thereto, the profiles 6 are opened, and the folded pack 1 is then cut to length.

The advantage of using a pressure element 9 that is configured as a sonotrode consists in the fact that straight line bonding beads 10 are possible. As a result, the adjacent sealing material of the sealing bands 8 is not exposed to any heat impact. Thus, melting of the meltable constituents outside the regions to be bond is avoided.

Bonding of the individual folds to one another is also avoided by the fact that the projection of outer edges 4, 5 beyond the profiles 6 is less than the length of the fold spacing 3. Thus, the filter insert manufactured by this method has good flexural and torsional movability.

Figure 4:
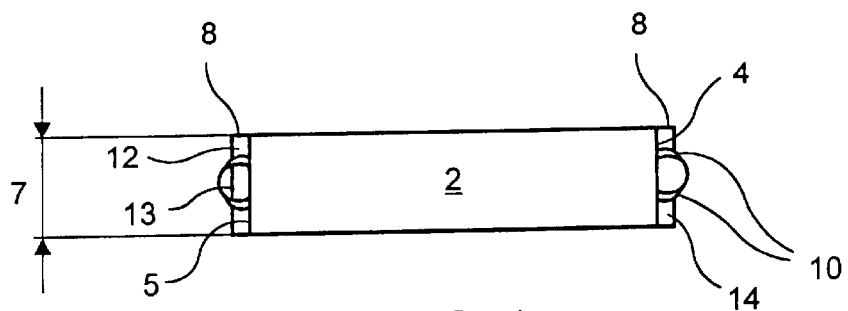
FIG. 4 is a sectional view taken along the line A—A in FIG. 3.

FIG. 4 is a sectional view taken along the line A—A in FIG. 3. FIG. 4 shows that each bonding bead 10 constricts the sealing bands 8, thereby forming sections 12, 13, 14, together having a height 7, which can be brought into engagement with a filter housing. The bonding beads 10 bound the substantially uncompressed section 13. Thus, when sections 12, 13, 14 come into sealing engagement with the filter housing, the sealing bands 8 perform the function of a labyrinth seal in the direction of the pressure differential.

Figure 5:
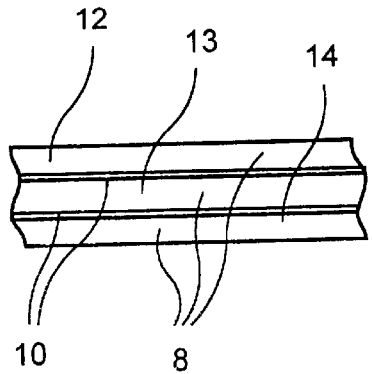
FIG. 5 shows a side view in the direction of arrow X in FIG. 3.

FIG. 5 shows a side view in the direction of arrow X in FIG. 3. FIG. 5 shows the straight line bonding beads 10, extending in the lengthwise direction.

A final, additional process step that may be carried out is bonding into the folds onto both ends of the folded pack 1 a thermoplastic film strip 16, shown in FIG. 1 which in this instance is arranged so as to fit around folded pack 1. The purpose of this strip is to reinforce the end in the horizontal direction, so that it can accept the seal pressure when the filter cassette is assembled. It is possible as an alternative to this, for example, to fill at least one fold pocket at each future cutting point, before cutting to length, with a plastic resin compound 17 which cures at room temperature. To cut folded pack 1 to length, it is then parted centrally in the retainer. The resulting cut surface thus forms an angled outer side of the folded pack 1, which has its height 7. The movability of the filter insert, both flexural and torsional, is not disadvantageously influenced by this.

What is claimed is:

1. A method for manufacturing a filter insert made of thermoplastically bondable nonwoven material, comprising the steps of:

(1) folding a planar filter medium and then setting the filter medium at a preset fold spacing to form a folded pack having a fold geometry and dimensions;

(2) providing clamping profiles substantially corresponding to the fold geometry and dimensions of the folded pack and clamping two outer edges of the folded pack in the clamping profiles, such that the clamping profiles engage the top and bottom of the folds, wherein the material of the folded pack projects beyond the clamping profiles at each outer edge a distance less than the distance of the fold spacing;

(3) placing a sealing band, corresponding in width substantially to a height of the folds, on each outer edge on the long sides of the folded pack;

(4) compressing and thermally bonding, by pressure elements, each sealing band to the respective outer edge of the folded pack, forming bond points compressed until cool, wherein the sealing bands are melted in a linear fashion to bond the sealing bands to the outer edges of the folded pack, and wherein at least two straight-line bonding beads, running parallel to one another, are formed along each outer edge of the folded pack and bound at least one substantially uncompressed section;

(5) removing the profiles; and (6) cutting the folded pack to a desired length.

2. A method according to claim 1, wherein the nonwoven material has bondable constituents and the pressure elements are heated to a temperature above the melting point of the bondable constituents of the nonwoven material.

3. A method according to claim 1, wherein the pressure elements are configured as ultrasonic sonotrodes.

4. A method according to claim 1, wherein before the folding step, the filter medium is cut to a width that substantially corresponds to the desired width of the folded pack.

5. A folded pack manufactured according to a method according to claim 1, wherein the sealing band consists of a nonwoven material and has a height corresponding to the height of the folded pack.

* * * * *